Jan. 14, 1964 R. BLECKMANN 3,118,124
FIXATION OF TUBULAR ELECTRIC HEATERS
Filed July 22, 1960 5 Sheets-Sheet 1
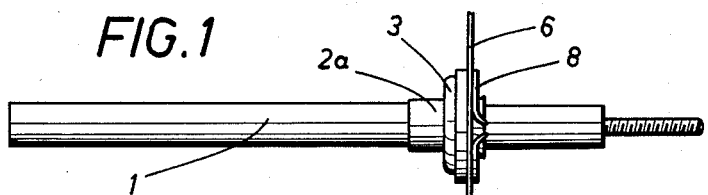
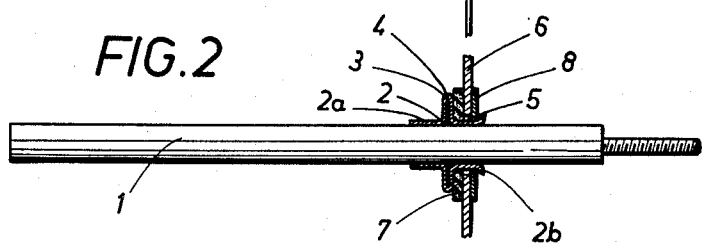
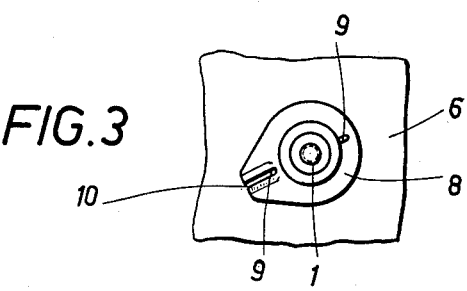
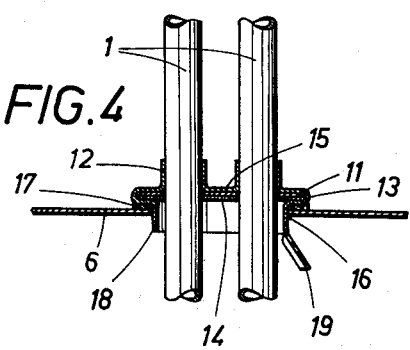
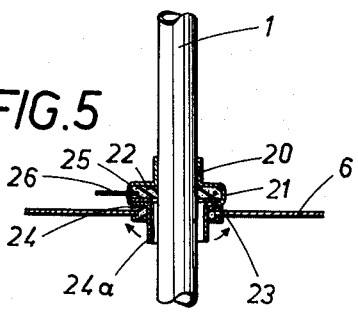

Jan. 14, 1964   R. BLECKMANN   3,118,124
FIXATION OF TUBULAR ELECTRIC HEATERS
Filed July 22, 1960   5 Sheets-Sheet 2
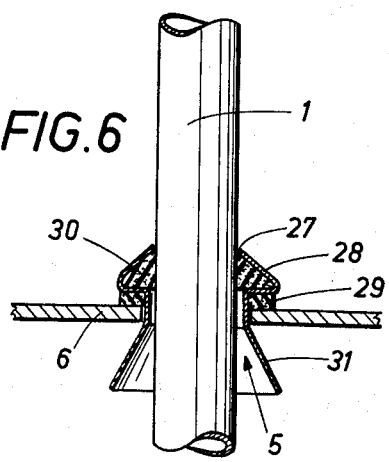
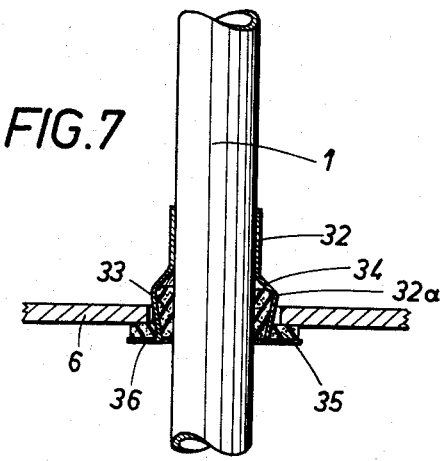
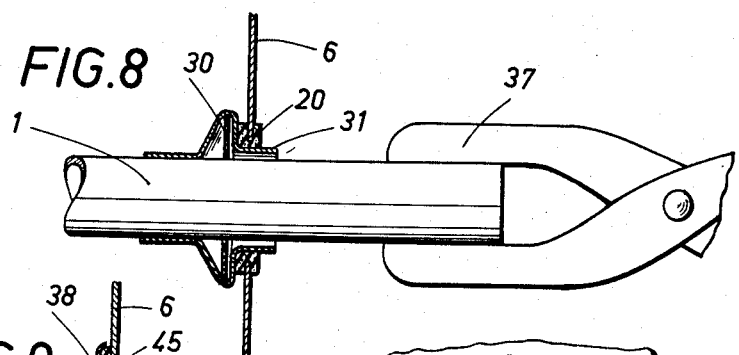
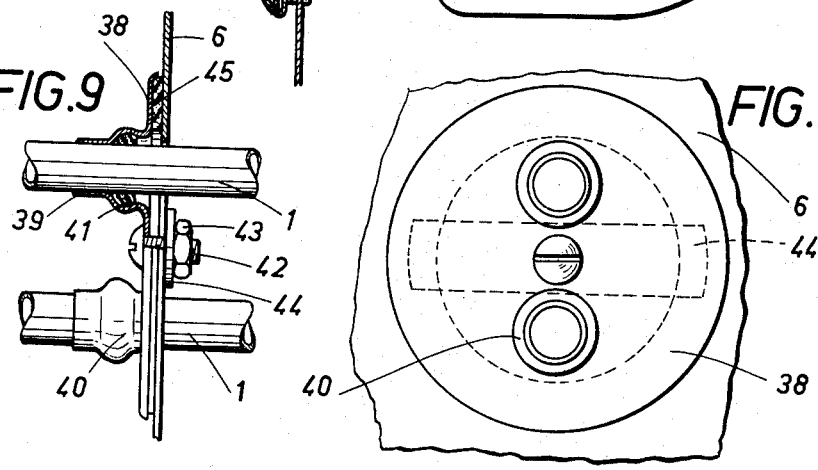
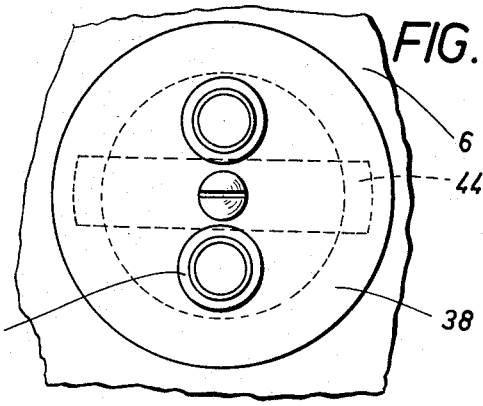

Jan. 14, 1964   R. BLECKMANN   3,118,124
FIXATION OF TUBULAR ELECTRIC HEATERS
Filed July 22, 1960   5 Sheets-Sheet 3
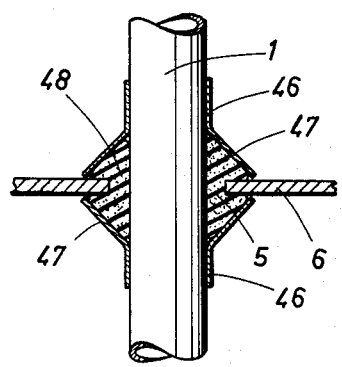
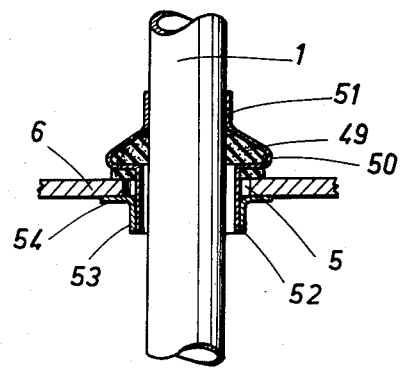
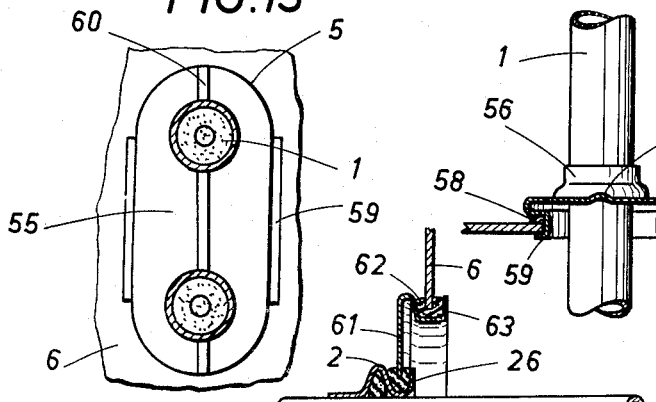
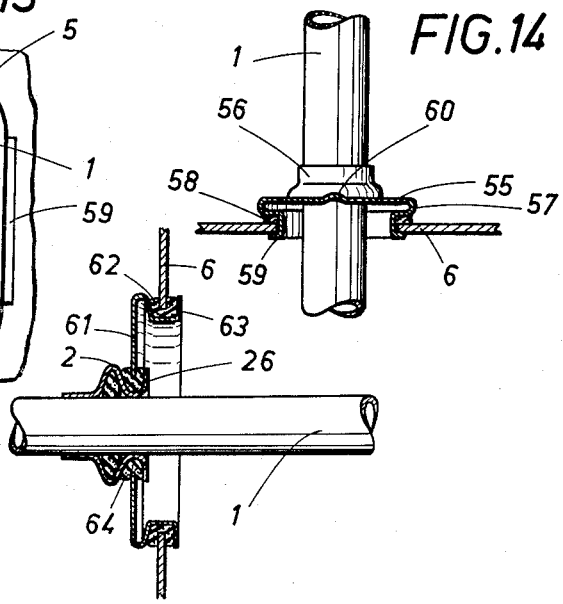
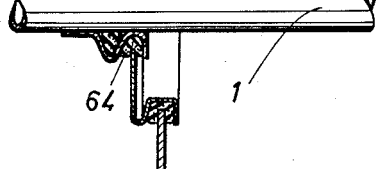

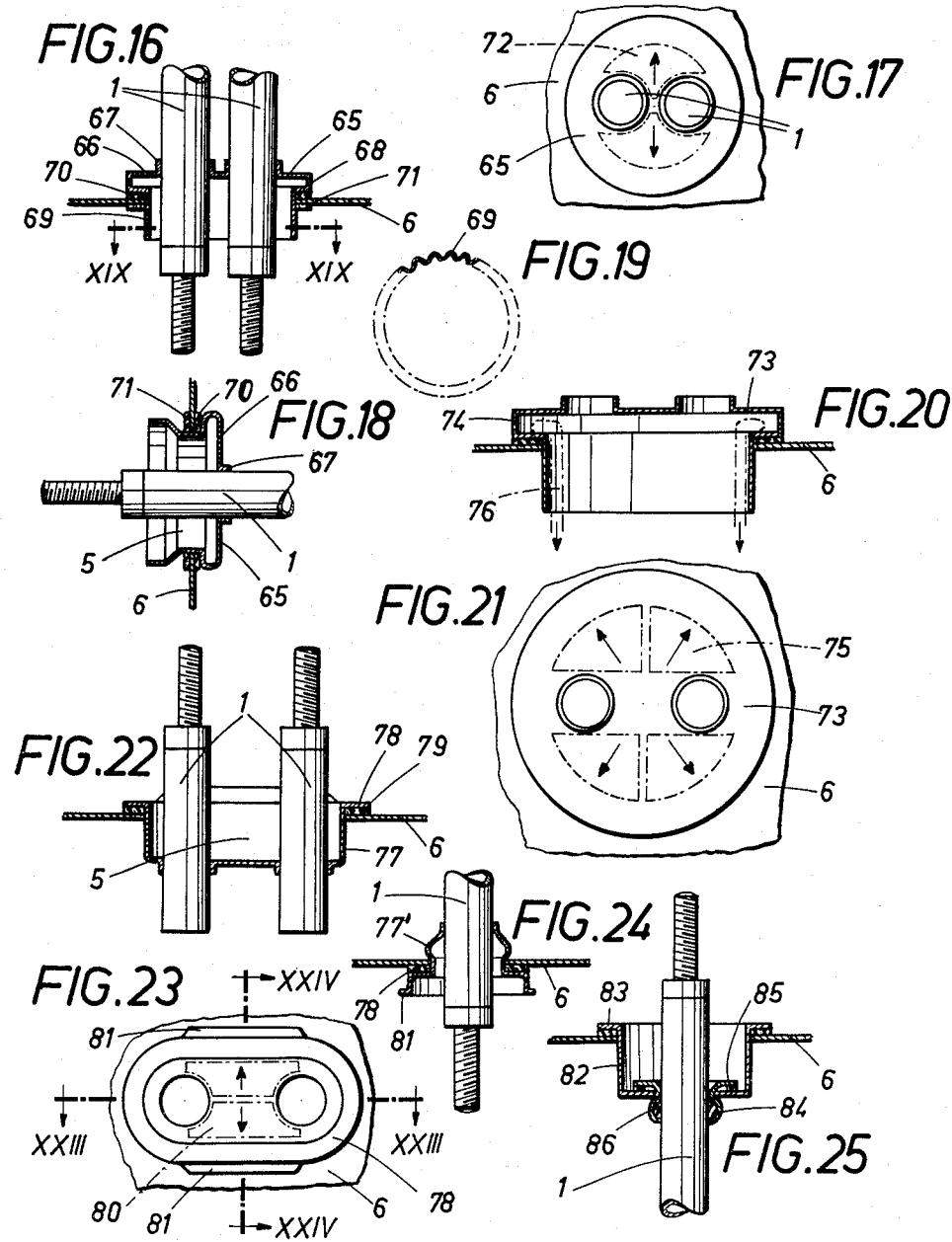

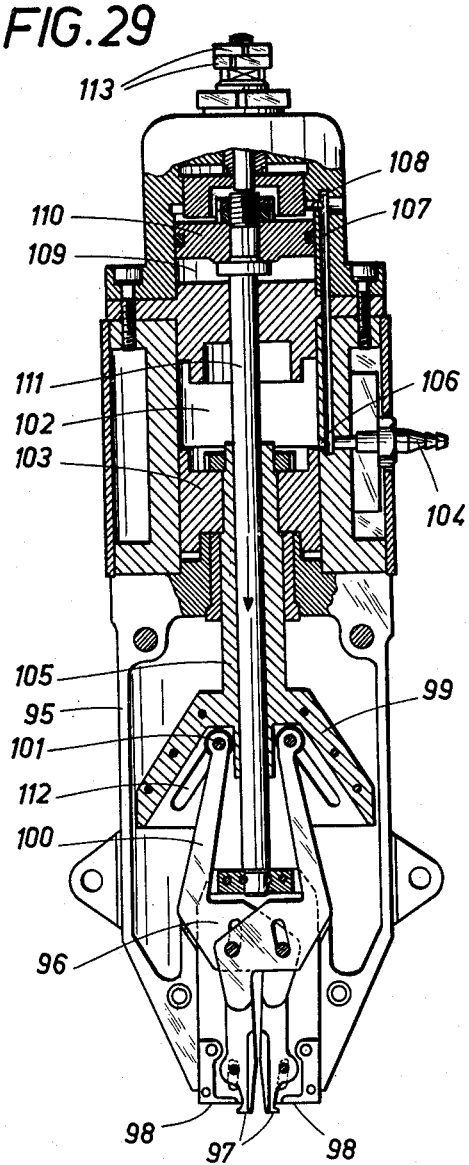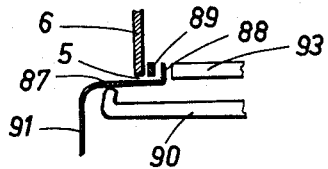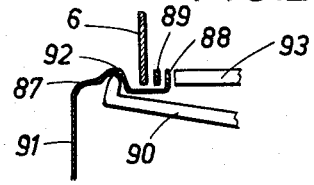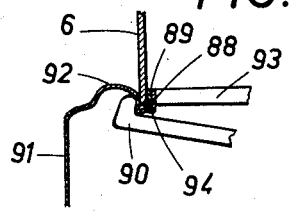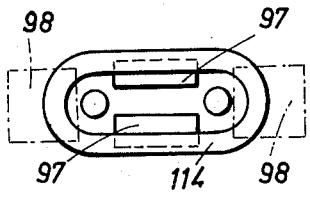

United States Patent Office 3,118,124
Patented Jan. 14, 1964

3,118,124
FIXATION OF TUBULAR ELECTRIC HEATERS
Richard Bleckmann, Imbergstrasse 24, Salzburg, Austria
Filed July 22, 1960, Ser. No. 44,616
Claims priority, application Austria July 23, 1959
11 Claims. (Cl. 338—317)

This invention relates to the fixation of tubular electric heaters in wall openings, such as the passage openings of housing or container walls, flanges and the like. Heaters have previously been fixed almost exclusively with the aid of screw-in nipples and flanges, which parts have also passage openings for the heaters and are braced against the wall portions surrounding the passage opening for the heaters, with gaskets being interposed between the flanges and wall parts. For this bracing a backstay consisting of a nut, a counterflange plate or the like is provided on the other side of the wall. In the case of thick walls the nipple thread or the screw used for bracing may engage a mating threaded opening of the wall or the like. To seal the heaters in the passage opening of the flange or nipple and for fixing purposes the heaters are in most cases soldered into these openings. The entire fixing arrangement is extremely expensive and can be practically made only with a high expenditure of material, labour and time.

It is an object of the invention primarily to provide a method which enables the fixation of tubular heaters in an extremely simple and inexpensive manner and within short time.

Another object of the invention resides in the provision of suitable fittings for carrying out this method, which fittings can be manufactured and affixed much simpler and at a smaller expense than the previous fastening parts.

Finally, it is an object of the invention to provide apparatus for performing the method in a particularly efficient manner.

The method according to the invention for fixing tubular electric heaters in openings of container walls, flanges and the like with the aid of fittings having passage openings for the heaters is essentially characterized in that thin-walled fittings of deformable, but form-retaining material are fitted on the heaters, which fittings have at least one cavity which is larger in cross-section than the cross-section of the heaters and when these fittings have been fitted onto the heaters and together with the heaters have been introduced into the wall openings are deformed so as to change the shape of their cavity in such a manner that they are connected to the heaters and to the walls surrounding the opening.

In the method according to the invention the fitting is thus used both for covering the wall opening as well as for fixing the heater and for fixing the fitting itself. As the fitting consists of thin-walled material and is deformed adjacent to its cavity, only small forces are required for the deformation. The fitting may be deformed so as to fix only the heater to the fitting or to fix only the fitting to the wall or both fixing steps may be effected by the deformation in subsequent operations.

According to the invention the fittings used in carrying out the method have one portion which is constructed to be readily destructible or deformable so that a fixed heater can be removed from the wall opening after this portion has been destroyed or deformed. This construction enables a quick performance of any replacements which may become necessary. In domestic appliances, e.g., the spare heater may be affixed with the aid of a normal flange or nipple.

Further details of the method according to the invention, of the fittings used in carrying it out, and of apparatus suitable for carrying out the method will be described more in detail hereinafter with reference to the accompanying drawings.

In the accompanying drawings the subject matter of the invention is illustrated by way of example.

FIGS. 1 to 3 are a side elevation, a longitudinal sectional view taken through the fitting and an elevation from the end of the tubular heater, respectively, and show a tubular heater fixed in a wall opening with a fitting according to the invention.

FIG. 4 is a sectional view showing an installed fitting consisting of a fixing flange.

FIGS. 5 to 7 are sectional views showing further installed fittings.

FIG. 8 is a diagrammatic sectional view taken through the fitting and showing the fixation of a tubular heater.

FIGS. 9 and 10 are a view partly in section and a top plan view, respectively, and show a fitting consisting of a flange.

FIGS. 11 and 12 are sectional views of further installed fittings,

FIGS. 13 and 14 are an internal view and a transverse sectional view showing an installed fitting consisting of a flange.

FIG. 15 is a sectional view showing a further installed, flangelike fitting with heaters affixed therein.

FIGS. 16 to 18 are two sectional views taken through the fitting and a top plan view, respectively, showing tubular heaters fixed with a round fitting.

FIG. 19 is a sectional view of the fitting taken on line XIX—XIX of FIG. 16.

FIGS. 20 and 21 are a sectional view and a top plan view, respectively, showing an additional fitting, the heaters being omitted.

FIGS. 22 to 24 are sectional views taken on lines XXIII—XXIII and XXIV—XXIV of FIG. 23 and a top plan view showing an additional fitting.

FIG. 25 is a sectional view showing a further fitting.

FIGS. 26 to 28 are diagrammatic views showing various steps of fixing a fitting similar to that of FIG. 22 in a wall opening.

FIG. 29 is a longitudinal sectional view showing an apparatus suitable for this purpose and FIG. 30 shows how the tool can be applied to an elongated fitting.

According to FIGS. 1 to 3 a sleeve 2 is fitted on the end of a tubular heater 1 and one end 2a of this sleeve is radially pressed to fix it to the shell of the tubular heater. The sleeve has a beadlike elevation 3, which accommodates a gasket 4 engaging the shell of the tubular heater. When the sleeve has been fitted on the tubular heater, the bead is upset in the axial and radial directions to ensure a safe engagement of the gasket on the inside wall of the sleeve 2 and on the shell tube of the tubular heater. The bead 3 forms a stop face. The heater 1 provided with the sleeve is introduced with its end into an opening 5 of the housing wall 6 until the bead 3 is firmly forced against a gasket 7, which is pushed from the end of the heater onto the sleeve and which bears on one side of the wall. A plate 8 having a bore is then pushed onto that end 2b of the sleeve 2 which protrudes through the opening. The protruding portion 2b of the sleeve is then flanged so that the sleeve and with it the heater are now fixed to the wall 6. The passage opening 5 of the housing wall 6 has such a size that it corresponds approximately to the outside diameter of the sleeve end 2b which has been flanged. On the other hand, the passage opening of the plate 8 is smaller so that the plate forms an adequate abutment for the rim of the sleeve. The plate is formed with a break notch 9 extending approximately in the direction of the diagonal of the passage opening. At the end of the break notch 9 the plate has on one side a slot 10, in which a screwdriver or the like can be inserted.

The screwdriver can be turned to break the plate 8 along the break notch or to bend apart its two halves separated by the break notch so that the plate can be removed. After the removal of the plate 8 the heater end can be pushed through the opening 5 so that the heater is removed. The installation may also be effected in that the sleeve 2 is first affixed alone in the passage opening 5 of the housing wall 6 and to the plate 8. Only after this fixation has been effected is the gasket 4 inserted into the beadlike elevation, whereafter the heater is pushed in and is fixed to the sleeve by upsetting the sleeve in the radial direction. The sleeve part 2a engaging the heater facilitates the grounding of the heater shell.

According to FIG. 4 a common fixing flange 11 is provided for the heaters 1. This fixing flange is integrally formed with sleevelike extensions 12, through which the heater ends can be pushed. After the heater ends have been introduced, the sleevelike extensions are radially pressed to clamp the heater ends. The flange has on its outside an annular bead 13, in which a reinforcing plate 14 and a gasket 15 are inserted. The annular bead is formed by inserting first the gasket and the reinforcing plate into a bowl-shaped base, whereafter that part of this base which protrudes over the gasket and the reinforcing plate is subsequently upset to the diameter of the wall opening 16. The annular bead forms again a stop flange position for the flange, which portion engages the wall, with a gasket 17 interposed. A protruding rim portion 18 of the flange can be inserted through the opening 16 and can then be flanged for fixing the flange. This rim has affixed to it a tab 19, with which the flanged rim can be pulled off.

According to FIG. 5 the fitting consists again of a sleeve 20. An annular bead 21 of the sleeve accommodates a gasket 22 and a reinforcing plate 23. These parts are inserted into the annular bead as in the construction shown in FIG. 4. The annular bead forms again a stop flange, with which the sleeve bears on the wall 6, with a gasket 24 interposed. The gasket 24 is U-shaped in cross-section after the sleeve has been pushed through the opening, its part 24 protruding through the opening is flanged to fix the sleeve. The annular bead accommodates also a tear-off wire 25, the end 26 of which extends to the outside. This tear-off wire can be pulled to separate the sleeve adjacent to the annular bead. This will permit the gasket 23 to relax and the heater with the sleeve 20 adhering thereto can then be removed from the opening.

The fitting shown in FIG. 6 is similar in construction to that shown in FIG. 1. A sleeve is provided, which is fixed to the heater by pressing. The pressing is effected with a press tool which operates with an inclination of about 45° to the heater axis. During the pressing operation the end 27 of the sleeve is forced against the shell of the heater. The sleeve has again an internal hollow annular bead 28, which forms a stop flange and bears against the wall 6 with a gasket 29 interposed. The annular bead 28 accommodates a gasket 30 and is inclined toward the end 27 of the sleeve at right angles to the direction in which the press tool acts. On the other side the bead is stepped approximately parallel to the wall 6. The end 31 of the sleeve extending though the opening 5 is flanged outwardly.

According to FIG. 7 a sleeve 32 is affixed to the heater by pressing. This sleeve widens from the end fixed by pressing. The widened sleeve portion 32a accommodates a gasket 33. After the gasket 33 has been introduced, the sleeve portion 32a is radially upset, particularly near its end, so that it is conically increased in thickness toward its step 34. Owing to this conical shape a reliable engagement of the outside wall of the widened sleeve portion with the rim of the opening is achieved when the heater is forced in. After the sleeve portion 32a has been inserted, a gasket 35 is pushed on this portion, whereafter the outer rim 36 of the sleeve is flanged.

FIG. 8 shows that the fitting may be used even if the housing in which the heater is to be accommodated is easily accessible only from one side, e.g., from the outside. During the fixation, the heater 1 is pushed through the housing opening from the inside and is then gripped with tongs 37 and held fast while the rim 31 is being flanged.

According to FIGS. 9 and 10 common flange 38 is provided for the heaters, which has sleevelike extensions 39, which are held in position by the heater passed through the same. The sleevelike parts have again annular beads 40, which accommodate gaskets 41. The entire flange can be braced with the aid of a bolt 42, which carries a nut 43, against a backstay 44 which consists of a cross-member and engages the inside of the wall. The outer rim of the flange is forced against the wall 6 from the other side, with gasket 45 interposed.

In the construction shown in FIG. 11 two sleeves 46 having mirror symmetry are pressed on the heater 1, which extends through the opening 5 of the housing wall 6. These sleeves have an obliquely outwardly extending rim 47 on their side facing the wall 6. A gasket 48 extending on both sides over the wall 6 is inserted in the opening 5. When the sleeves 46 have been pressed on the heater, their rims 47 are obliquely bent toward the wall until their ends engage the wall. This serves at the same time to prestress the gasket 48. At least one of the two sleeves 46 may be again provided with a weak portion, a tear-off wire or a break notch.

According to FIG. 12 the sleeve 51 pressed on the heater and having an annular bead 50 which accommodates a gasket 49 has a tubular extension 52, which extends through the opening 5 of the wall 6 and the outside wall of which is slightly conically tapered toward its end. A sleeve 53 serving as a backstay is pressed on this extension. The opening of the sleeve 53 is also slightly conical. The sleeve 53 has an abutment collar 54 engaging the wall 6. The conical shape ensures that the sleeve 53 will reliably adhere to the extension 52.

In the construction according to FIGS. 13 and 14, the housing wall 6 is formed with an elongated opening 5. An elongated flange 55 conforming to this opening serves for fixing the heaters 1 and has sleevelike extensions 56, in which the heaters 1 are affixed. The flange has at its periphery a bead 57, with which it is forced against the wall 6, with a gasket 58 interposed. Lug-shaped extensions 59 are provided on the longitudinal edges of the flange and can be inserted through the opening 5a and can then be bent over to fix the flange. To facilitate the removal of the flange, it has a longitudinal bead 60, along which it can be squeezed together by exerting strong pressure against the longitudinal sides of the bead 57 when the flange is to be removed. By this squeezing the lugs which have been bent over are disengaged from the wall 6 and may then be passed through the opening 5a also in their bent shape.

According to FIG. 15 a circular flange 61 is inserted in a round opening of the housing wall 6 and has a stop flange portion 63 which can be passed through the opening and after having been passed therethrough has been flanged, with a gasket 62 interposed. The circular flange has openings 64, in which heaters 1 are affixed with the aid of a fixing element 2 according to FIG. 1. In this construction and in that of FIGS. 13 and 14 the entire flange 61 or 55 can be replaced by a blind flange having no opening. Such a blind flange is provided, e.g., when the containers of electrically heatable washing machines are inherently provided with an opening for the introduction of the heaters and the heaters are to be only selectively fitted. Where the blind flange is provided it is sufficient to remove the blind flange and to mount a flange or the like provided with heaters when heaters are to be fitted. Alternatively, the flange openings 64 may be closed by suitable fittings such as those shown in FIG. 1. The fittings used for this purpose would have to have a flat cover instead of the sleeve extension 2a. In this case the fitting would have the shape of a bowl.

According to FIGS. 16 to 19, a bowl-shaped fitting 65 is provided, the bottom 66 of which is formed with openings through which the heater ends 1 extend. The rims 67 of the openings are raised and when the heater ends 1 are inserted these rims are upset to force them against the heater ends. The heaters are soldered into the rims 67 of the openings to provide a tight seal. On the bottom side the fitting has an annular bead 68, from which the shell 69 is stepped to the diameter of an opening 5 formed in the wall 6. As is apparent from FIG. 19 the reduced shell portion has a wave-shaped longitudinal sectional shape. When the heaters have been affixed to the fitting, the latter is affixed by being introduced from one side into the opening 5 of the wall 6 until the annular bead 68 serving as a stop flange engages the wall 6, with a gasket 70 interposed. Then another gasket 71 is pushed on the reduced shell portion 69, whereafter this shell portion is widened to the shape shown in FIG. 18. An expanding tool having jaws 72 indicated with dash-and-dot lines in FIG. 17 may be used for expanding.

The fitting 73 according to FIGS. 20 and 21 is larger than that shown in FIGS. 16 to 19. The fitting 73 has also an annular bead 74 on its bottom side. The fixation is effected with the aid of an expanding tool having four jaws 75, which are illustrated with dash-and-dot lines in FIG. 21 and can be expanded in the direction of the arrow. In order to ensure that the annular bead 74 will be adequately forced against the wall 6 during the expanding operation, hooklike holders 76 may be provided, the hooks of which are inserted into the annular bead 74 so that the pulling of the hooks will exert the desired force.

According to FIGS. 22 to 24, elongated fittings are provided for fixing the heaters. The fitting 77 is bowl-shaped and like an insert cover has on its open side a protruding flange 78. After the bowl portion has been introduced into the opening 5 of the wall 6 the stop flange 78 engages the wall with a gasket 79 interposed. After the fitting 77 has been introduced, an expanding tool having two jaws 80 which are shown in FIG. 23 and can be expanded in the direction of the arrow is introduced into the fitting 77 from the open side thereof and that part 77' of the fitting which extends into the opening is widened so that two beads embracing the rim of the opening are formed on the longitudinal sides of the fitting. The stop flange 78 of the fitting carries two protruding lugs 81, to which tongs or the like can be applied. When it is desired to remove the fitting, it is squeezed by forcing the two lugs 81 together so that said beads can pass through the opening.

According to FIG. 25 a bowl-shaped fitting 82 is again provided, which is introduced as far as to stop flange 83 and is then fixed in the wall by being expanded. The heater 1 extends through an opening in the bottom of the fitting 82. A sleeve 84 of deformable material is fitted over the heater and is pre-shaped with an S-shaped generatrix. Two gaskets 85 and 86 are inserted in the two recesses formed by the bends of the S. When the sleeve 84 has been fitted, it is upset in the axial direction whereby it is firmly forced against the heater and against the rim of the opening of the fitting 82.

The manner in which a fitting similar to that shown in FIG. 22 can be fixed is apparent from FIGS. 26 to 28. In accordance therewith a bowl-shaped fitting 87, in which the heaters are affixed, is introduced into an opening 5 of a wall 6 until a stop flange 88 of this fitting loosely engages one side of the wall, with a gasket ring 89 interposed (FIG. 26). Then the two end jaws 90 of an expanding tongs are introduced into the fitting and are expanded to expand the fitting at two opposed points close to its bottom 91 so that the expanded portions 92 loosely embrace the rim of the opening on the inside of the wall (FIG. 27). Backstay jaws 93 are now engaged with the stop flange 88 and the tong jaws 90 are pulled out toward the backstays 93 so that the portion 94 of the fitting 87 gripped between the backstays 93 and the tong jaws 90 is compressed, with a partial further expansion of the previously expanded portions 92, until the outside surface of the expanded portion 92 firmly engages the inside of the wall 6 and the gasket 89 is firmly gripped between the stop flange 88 and the outside of the wall 6 (FIG. 28).

Apparatus as shown in FIG. 29 is provided for carrying out the method described hereinbefore. This apparatus has a housing 95, in which expanding tongs consisting of toggle lever tongs 96 are affixed, the working jaws 97 of which extend outwardly through a mouth opening of the housing. Backstays 98 are slidably mounted in the housing beside the mouth opening of the housing and beside the jaws 97. A cam guide 99 in the form of a hollow frustum of a cone, which is slidably mounted in the housing, is provided for operating the tongs and is engaged by rollers 101 mounted at the ends of the tong levers 100. The cam guide 99 can be displaced by means of a piston 103 guided in a cylinder 102 connected to the housing 95. The illustrated position of the cam guide corresponds to the extreme expanded position of the jaws 97. The piston 103 can be displaced toward the other end of the cylinder to cause the jaws 97 to engage each other. Compressed air can be selectively supplied to the piston from one side or the other through supply gaps, not shown, which are formed in both ends of the cylinder and under the control of a cock, which consists in most cases of a handle for the entire housing and which is connected to a compressed-air supply conduit 104. To fix a fitting, the latter is first inserted into the wall opening. When the piston is in its right-hand end position the expanding jaws 97, which are then in engagement with each other, are inserted into the fitting. Then compressed air is applied to the piston so that the latter moves to the end position shown in the drawing, whereby the jaws 97 move apart and expand the fitting as shown in FIG. 27. As soon as the piston 103, which is connected to the cam guide 99 by means of a hollow piston rod 105, has reached the end position shown in the drawing, it exposes an overflow slot 106, which is connected by a conduit 107 to another slot 108 in a cylinder 109 and applies fluid pressure to a piston 110 guided in this cylinder. By means of a piston rod 111 this piston pushes the backstays 98 to the left in the direction of the arrow so that the housing 95 and with it the tong jaws 97 are displaced opposite to the direction of the arrows and the tong jaws, as is illustrated in FIG. 28, where the tong jaws have the reference 90, compress the portion of the fitting gripped between the jaws and backstays. As soon as the desired deformation of the fitting has been effected which the amount of this deformation can be adjusted by the stop nut 113 mounted on that end of the piston rod 111 which extends out of the housing 85 the amount of this deformation the superatmospheric pressure acting on that side of the piston 103 to which pressure was supplied so far is shut off by means of the cock and pressure is applied to the other side of the piston so that the latter returns to its initial position, whereby the tong levers 100 are also moved to their initial position by pin which engage slot 112 of the cam guide 99 and the piston 110 is returned by means of drivers or the like.

The method described hereinbefore and the appertaining apparatus may be used with round and elongated fittings. As is shown in FIG. 30 the jaws 97 of the expanding tool may be applied to the two longitudinal sides of an elongated fitting such as 114 whereas the backstays 98 may engage the narrow sides of such fitting.

The apparatus shown in FIG. 29 is mainly intended for the series installation of fittings. Mechanically operated tonglike hand tools may obviously be used for carrying out the method described hereinbefore in the case of individual installation jobs.

What is claimed is:

1. A method of fixing a tubular electric heater to a structure having a mounting opening, which comprises mounting on the heater a thin-walled tubular fitting of deformable and form-retaining material, said fitting being formed with a passage therethrough receiving said heater and having a cross-section larger than the cross-section of said heater, inserting the heater with the fitting mounted thereon into said opening and deforming said fitting to change the shape of said passage until said fitting sealingly engages said heater and said structure.

2. A method of fixing an elongated electric heater to a structure having a mounting opening which comprises:
   (a) inserting an annular gasket in a hollow flange portion of a flanged thin-walled tubular fitting of deformable and form retaining material, said fitting being formed with a passage therethrough;
   (b) mounting said fitting on said heater in such a manner that said heater is received in said passage, and said flange portion is fitted on an end portion of said heater;
   (c) inserting said end portion of said heater into said mounting opening until said flange portion engages said structure; and
   (d) deforming said fitting to change the shape of said passage, until said gasket sealingly engages said heater and said fitting sealing engages said structure.

3. A method as claimed in claim 2, wherein said end portion of said heater is inserted into said mounting hole by movement thereof in a predetermined direction, the method further comprising the step of securing said heater in said mounting opening against movement in a direction opposite to said predetermined direction.

4. A method as set forth in claim 1, in which said fitting is partly bowl-shaped and has a cavity open on one side, said fitting is mounted on the end of the heater, is at least partly introduced into said mounting opening and is thereafter deformed to partly expand said cavity and connect said fitting to said structure.

5. A method as set forth in claim 4, in which said bowl-shaped fitting has a second passage opening used for connecting a second tubular heater to said structure.

6. A method as set forth in claim 1, in which said fitting has a stop flange and is introduced into said mounting opening until said stop flange engages said structure, and a portion of the fitting extends from said stop flange beyond said opening, the method further comprising expanding said fitting portion, until the expanded portion embraces the rim of the opening from the side opposite to said stop flange.

7. A method as set forth in claim 4, in which said bowl-shaped fitting includes a shell having a bottom, and is introduced into said mounting opening so that said shell bottom extends beyond said opening, a gasket is applied to said shell adjacent to said structure, and said shell is expanded close to said bottom, and the fitting is compressed in the axial direction of the mounting opening to prestress said gasket.

8. A method as set forth in claim 7, in which said gasket is applied to said shell on that side of said structure where said shell is to be expanded.

9. A method as set forth in claim 7, in which said bowl-shaped fitting has a stop flange opposite said bottom, and said gasket is applied to said shell on that side of said structure where said stop flange is disposed.

10. A method as set forth in claim 7, in which said fitting has a stop flange spaced from said bottom, said structure being interposed between said bottom and said flange when said shell is introduced into said opening, and said fitting is radially expanded with an expanding tool axially introduced into the passing of said fitting and the expanded portion is then axially deformed towards said structure by pulling the expanding tool and at the same time holding the fitting at the stop flange.

11. A method as set forth in claim 7, in which said bowl-shaped fitting has a stop flange a portion of said fitting spaced from said flange is expanded with an expanding tool introduced into its cavity and the portion of the fitting which is disposed between the expanded portion and said stop flange is compressed.

References Cited in the file of this patent

UNITED STATES PATENTS

| | | |
|---|---|---|
| 414,519 | Gladding | Nov. 5, 1889 |
| 1,190,803 | Rosenfeld | July 11, 1916 |
| 1,480,757 | Hafer | Jan. 15, 1924 |
| 1,916,804 | McNab | July 4, 1933 |
| 2,227,159 | Schurig | Dec. 31, 1940 |
| 2,398,041 | Russel | Apr. 9, 1946 |
| 2,594,255 | Charbonneau | Apr. 22, 1952 |
| 2,684,420 | Fox | July 20, 1954 |
| 2,761,486 | Reardon | Sept. 4, 1956 |
| 2,813,568 | Kilmarx | Nov. 19, 1957 |
| 2,890,521 | Miller | June 16, 1959 |
| 2,957,511 | Reif | Oct. 25, 1960 |